Jan. 27, 1948.  J. R. HOTCHKIN  2,435,079
FASTENING DEVICE
Filed July 24, 1945

INVENTOR
James Rowland Hotchkin
BY
Ramsey, Kent & Chisholm
ATTORNEYS

Patented Jan. 27, 1948

2,435,079

UNITED STATES PATENT OFFICE 2,435,079

FASTENING DEVICE

James Rowland Hotchkin, Short Hills, N. J., assignor to The Palnut Company, Irvington, N. J., a corporation of New Jersey Application July 24, 1945, Serial No. 606,848

7 Claims. (Cl. 85—36)

This invention relates to a sheet metal nut for insertion into wood or similar material, whereby a metallic screw-threaded engagement may be provided for cooperation with a bolt, lag screw, etc.

Among the objects of the invention are to provide a nut which is easily insertable beyond the surface of the wood into fixed position in a recess therein, which will retain itself in the recess, which will hold itself against turning while the bolt or lag screw is being screwed home or being removed, which makes strong screw-threaded engagement with the bolt or lag screw, which can be rapidly and economically manufactured on a quantity production basis, and which can be stamped from sheet metal.

Another object of the invention is to provide an improved blank to be formed into a sheet metal nut.

Further objects, and objects relating to details and economies of construction and operation will more definitely appear from the detailed description to follow. My invention is defined in the appended claims. In the claims, as well as in the description, parts are at times identified by specific names for clarity and convenience but such nomenclature is to be understood as having the broadest meaning consistent with the context and with the concept of my invention as distinguished from the pertinent prior art. The best form in which I have contemplated applying my invention is illustrated in the accompanying drawings forming a part of this specification, in which:

Figure 1:
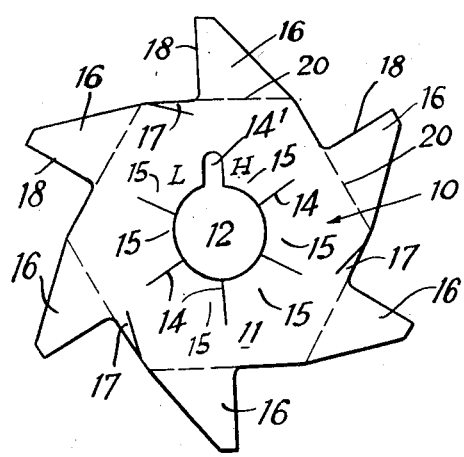
Fig. 1 is a top plan view of a preferred form of sheet metal blank from which a sheet metal nut, according to this invention, may be formed.

The nut may be formed from a sheet metal blank having a central aperture the boundary of which is adapted to be distorted into a thread-engaging edge. This thread-engaging edge may be continuous or it may be composed of a plurality of separate tongues. Referring to Fig. 1, the blank is indicated generally at 10. It has a base portion 11, provided with a central aperture 12. The metal surrounding the aperture is divided into a plurality of tongues 15 (six shown) by a slot 14' and a plurality of slits 14. The slot 14' is of a width sufficient to permit adequate deflection of its sides to allow entrance thereinto of the thread of a bolt or lag screw. The periphery of aperture 12 is a spiral, as is indicated in Fig. 1. Beginning at the right-hand side of slot 14', the edge of the aperture recedes gradually until it reaches the left-hand side of slot 14'. By reason of the spiral configuration of the aperture, the adjacent metal is adapted for distortion into a helical edge which will snugly embrace the thread-root of a lag screw or the like. In making the distortion, the tongues 15 are canted and the successive tongues are increasingly displaced from the tongue marked L (low) to the tongue marked H (high), the displacement being in the direction of the axis of the thread. Thus, in the finished nut as viewed in Fig. 3, the tongue 15 marked H is at a higher level than the tongue 15 marked L, and the edges of slot 14' are so disposed as to provide for the entrance of the thread of a bolt or lag screw. Also, the aperture 12 as viewed in plan in Fig. 3 is circular.

Extending outwardly from the base 11 of the blank are a number of primary points or prongs 16 (six shown). By means of short shear cuts into the metal of base 11, the blank is provided with a number of secondary points or prongs 17 (three shown). Points 16 are designed to be bent upwardly at such an angle to base 11 as to flare outwards. The line of bend 20 is substantially at right angles to side 18 of each point 16; and where there is an adjacent secondary point 17, the line of bend 20 is substantially in alignment with the outer edge of the secondary point. Secondary points 17 are designed to be bent downwardly at right angles to the plane of base 11.

Figure 2:
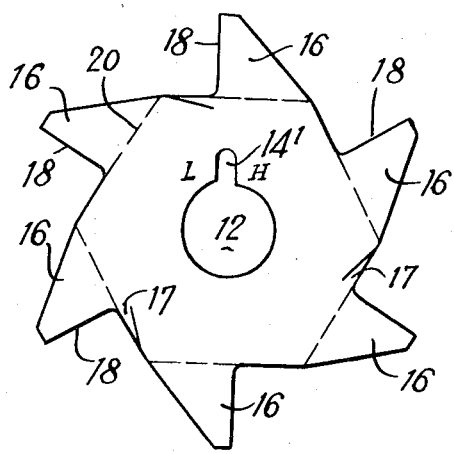
Fig. 2 is a top plan view of a modified form of blank.

The slits 14 shown in Fig. 1 may be varied in number, and may be eliminated entirely. Fig. 2 shows a blank having no slits 14, but having the slot 14' through which the thread of the bolt or lag screw is adapted to enter when the metal surrounding the aperture 12 has been deformed into a female thread. Fig. 4 shows the nut produced from the blank of Fig. 2. It differs from the nut of Fig. 3 only in that the convolution of female thread formed about aperture 12 is a continuous edge progressing helically upwardly from L to H, instead of being an edge interrupted by slits 14.

Figure 3:
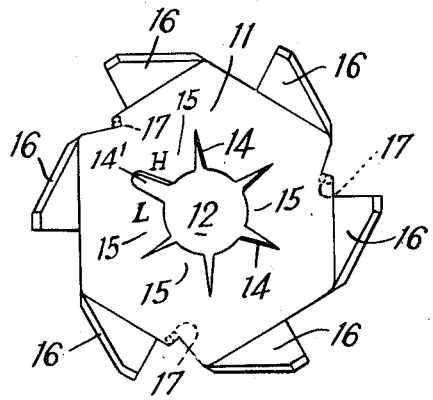
Fig. 3 is a top plan view of a nut formed from the blank shown in Fig. 1.
Figure 4:
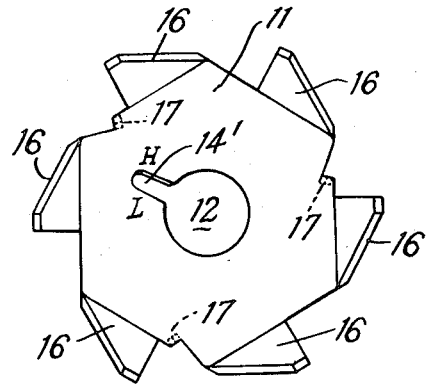
Fig. 4 is a top plan view of a nut formed from the blank shown in Fig. 2.
Figure 5:
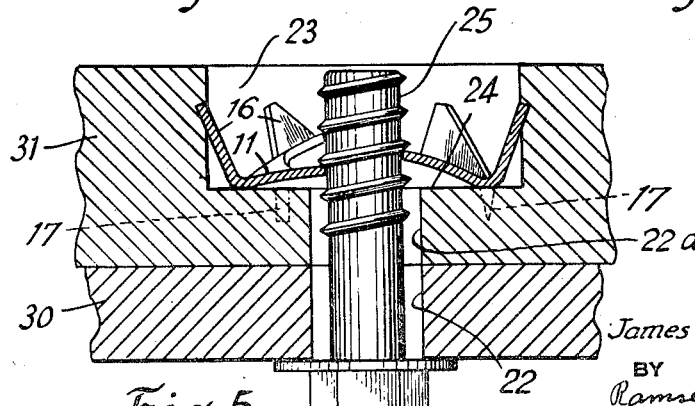
Fig. 5 is a view in section showing a nut of the present invention positioned in a wooden member and engaged by a lag screw.

The nut shown in Fig. 5 may be either the nut of Fig. 3 or the nut of Fig. 4. In either case the nut is formed from a blank in which the aperture 12 has a spiral edge; and in the finished nut the edge of the aperture is a helix which throughout its length snugly embraces the thread root of the bolt or lag screw. To more snugly embrace the bolt or lag screw, the aperture 12 in the finished nut may be a trifle undersize with respect to the root diameter of the bolt or lag screw. The bolt or lag screw will then expand the nut aperture as it enters the same, and the nut will resiliently grip the bolt or lag screw, even when the bolt or lag screw is not screwed entirely home.

Fig. 5 shows a member 30 secured by a lag screw 25 to a member 31 in which the nut has been previously installed. Members 30 and 31 are provided with holes 22 and 22a which provide ample clearance for the passage of the threaded portion of the lag screw. Member 31, which is of wood or other more or less yieldable material, is counterbored at 23 thereby providing an annular shoulder 24.

In installing the nut, it is telescoped into the counterbore and forced downwardly to the position shown in Fig. 5. Secondary prongs 17 clear the side wall of the counterbore 23 and penetrate into the shoulder 24. The primary prongs 16, which are inclined outwardly, engage the wall of the counterbore by a substantial margin. As the nut is forced home, the primary prongs 16 are cammed inwardly by the wall of counterbore 23, and thereby placed under stress. The nut being springy, each prong 16 tends to return to its unstressed position and the entire reaction force developed in the prong is imposed upon by the area of contact between the tip of the prong and the wall of the counterbore. Since this area of contact is small, the tip of each prong 16 digs into the counterbore in the fashion shown in Fig. 5. Thus, the nut is adequately retained in the counterbore while part 31 is being handled preparatory to assembly of lag screw 25 therewith.

As the lag screw is being screwed into the nut, rotation of the nut in the counterbore is prevented by secondary prongs 17. Rotation of the nut is further resisted by the engagement of the edges 18 of primary prongs 16 with the wall of the counterbore, these edges lying substantially in a plane which contains the axis of the lag screw. Aperture 12 of the nut is preferably so sized, as previously explained, that it resiliently grips the thread-root of the lag screw. As the lag screw is drawn up tight, it applies downward pressure to the tongues 15, thereby deflecting the tongues somewhat in an axial direction and setting up a wedging action which causes the tongues to more firmly engage the thread-root of the lag screw. Similar action occurs with the nut of Fig. 4 which does not have the plurality of tongues 15. With both forms of the nut the base thereof has a continuous peripheral band of metal which adequately resists expansion of the aperture 12 by the wedging action.

In making the nut it may be blanked out and formed by any suitable mechanical operations. Quantity production will be facilitated by the use of punching and forming dies designed for the particular job pursuant to known metal working practice. For some uses the secondary prongs 17 may be omitted, and where it is feasible to do so, the manufacture of the nut is simplified. The nut is made of suitable spring metal. For some purposes non-ferrous spring metal is desirable, but for most purposes I prefer spring steel which I harden and temper after the nut has been formed. Any suitable tool may be used to install the nut in the counterbore. For example, the nut may be seated in the counterbore by pressure or hammer blows applied to a punch having a tubular nose which is telescoped within the circle of prongs 16 and positioned against the base 11 of the nut.

I claim:

1. In combination with a member having a counterbored and shouldered bolt-hole, a threaded nut positioned in the counterbore and against the shoulder, said nut comprising: a sheet metal base provided with a substantially central aperture the edge of which is adapted to engage the threads of a bolt, said base having an uninterrupted annular zone of sufficient radial width to afford resistance to radial expanding strain upon said nut, prongs extending downwardly from said base and embedded in the shoulder portion of said member, and prongs extending upwardly and outwardly from said base and engaging the wall of the counterbore.

2. A sheet metal nut, comprising: a base having a central aperture, thread-engaging means at the edge of the aperture, a plurality of prongs extending downwardly from the peripheral edge portion of the base, and a plurality of prongs extending upwardly and outwardly from the peripheral edge portion of the base for engaging the wall of a socket upon insertion of the nut therein.

3. A nut for insertion into a counterbore having an annular shoulder at the bottom of the counterbore, said nut comprising: a sheet metal member having a central aperture the edge of which is helically distorted to provide a female thread for engagement with a male thread, a slot extending from said aperture for the passage therethrough of the male thread, a plurality of prongs disposed on a circle somewhat smaller than the counterbore and extending in a direction to engage the shoulder thereof, and a plurality of other prongs extending in a direction to engage the wall of the counterbore, whereby said nut may be seated in the counterbore and engaged with the wall and shoulder thereof to retain it in position.

4. A nut for insertion into a counterbore having an annular shoulder at the bottom of the counterbore, said nut comprising: a sheet metal member having a central aperture provided with thread-engaging means, said member having a plurality of prongs extending in a direction to engage the shoulder of the counterbore, and having a plurality of prongs extending in a direction to engage the peripheral wall of the counterbore, whereby said nut may be fixedly seated in the counterbore.

5. In combination, a member having a counterbored and shouldered bolt-hole, and a nut within the counterbore, said nut comprising: a sheet metal member having a central aperture, the edge of the aperture being helically distorted for engagement with a male thread, said member having a plurality of prongs extending at substantially right angles to the plane thereof and into the shoulder of the counterbore, and having a plurality of outwardly flared prongs extending away from said shoulder and into engagement with the peripheral wall of the counterbore, said nut being retained in the counterbore by said prongs.

6. A one-piece sheet metal nut for insertion into a counterbore, comprising: a sheet metal member having a base portion provided with a central aperture the boundary of which is formed as a female thread, a plurality of prongs bent downwardly from said base at substantially right angles to the plane thereof, the lines of bend of said prongs being tranverse to the circumference of a circle concentric with said aperture, and a plurality of other prongs bent upwardly and outwardly from said base, the line of bend of each of said other prongs being a chord of a circle concentric with said aperture, and the tips of said other prongs being disposed on a circle somewhat larger than the counterbore for making holding engagement therewith.

7. A one-piece sheet metal nut for insertion into a socket, said nut comprising: a base portion provided with a central aperture the boundary of which is formed as female thread means, said aperture being surrounded by an uninterrupted annular zone of sufficient radial width to afford resistance to radial expanding strain upon the nut, and a series of prongs extending upwardly from the base portion, said prongs being disposed with a measure of outward inclination and having the tips thereof lying on a circumference somewhat larger than the socket bore for which the nut is designed whereby the tips make holding engagement with the socket, said prongs having edges which lie in planes substantially perpendicular to said base portion, said edges facing in the direction of rotation of a bolt being threaded into said aperture.

JAMES ROWLAND HOTCHKIN.

REFERENCES CITED

The following references are of record in the file of this patent:

UNITED STATES PATENTS

| Number | Name | Date |
|---|---|---|
| 955,577 | Bradshaw | Apr. 19, 1910 |
| 1,899,715 | Olson | Feb. 28, 1933 |
| 1,956,473 | Perry | Apr. 24, 1934 |
| 1,960,381 | Knapp | May 29, 1934 |
| 2,234,097 | Tinnerman | Mar. 4, 1941 |